United States Patent
Dormody

[15] 3,650,504
[45] Mar. 21, 1972

[54] OPTICAL MOUNT
[72] Inventor: James W. Dormody, Bristol, Conn.
[73] Assignee: Carson Laboratories, Inc., Bristol, Conn.
[22] Filed: Apr. 3, 1970
[21] Appl. No.: 25,327

[52] U.S. Cl..............................248/466, 248/205, 248/309
[51] Int. Cl. .........................................................G02b 7/18
[58] Field of Search................248/205, 298, 443, 451, 452,
248/453, 466, 475, 476, 309; 49/463; 52/499, 500,
601, 627, 656; 350/251

[56] References Cited

UNITED STATES PATENTS

| | | |
|---|---|---|
| 2,538,318 | 1/1951 | Mitchell..............................248/453 X |
| 3,296,763 | 1/1967 | Curl......................................52/500 X |
| 1,688,953 | 10/1928 | Yeager..................................52/500 X |
| 2,514,068 | 7/1950 | Johnston................................248/443 |
| 377,648 | 2/1888 | Sinning.................................292/257 |

FOREIGN PATENTS OR APPLICATIONS 365,758  10/1921  Germany..............................248/443

Primary Examiner—William H. Schultz
Attorney—Fishman and Van Kirk

[57] ABSTRACT

An optical mount comprising a heavy, rigid support member having finished guide surfaces for rigidly mounting one or more optical devices on the support member. The devices are readily installed and removable by an eccentric lock and are isolated from environmental vibration when installed.

11 Claims, 1 Drawing Figure

Patented March 21, 1972
3,650,504
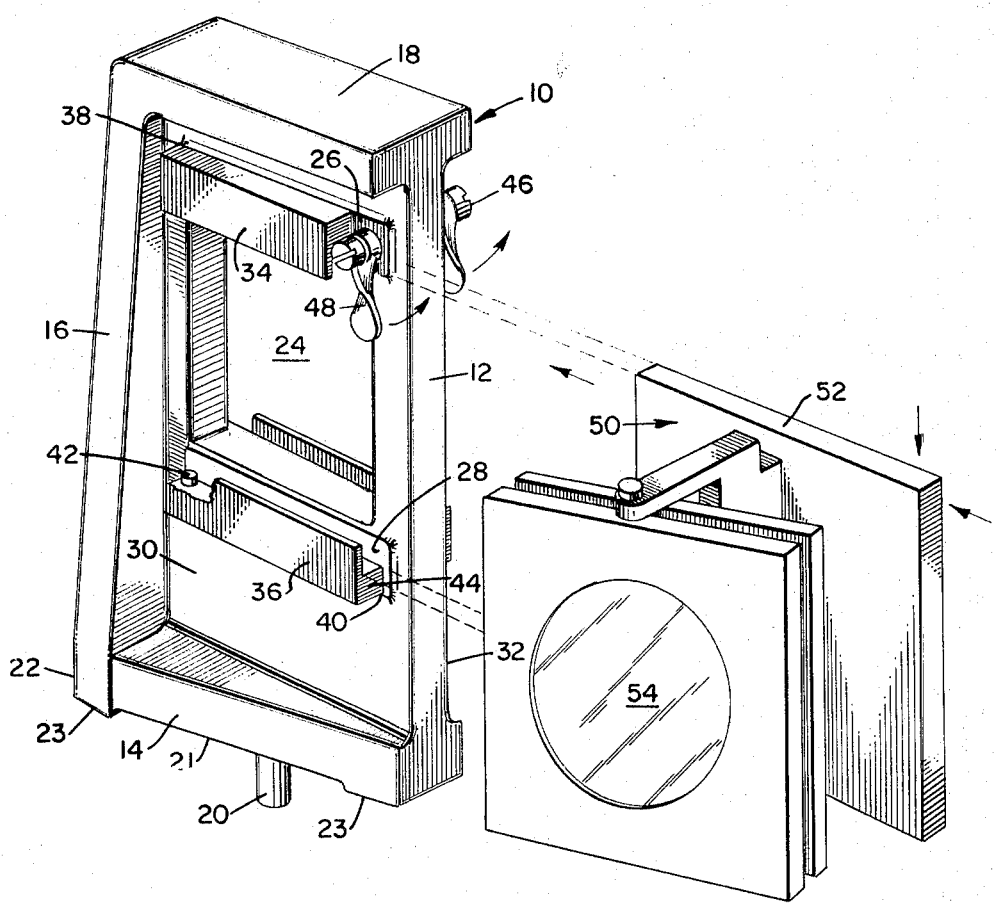
INVENTOR
JAMES W. DORMODY
BY
FISHMAN & VAN KIRK
ATTORNEYS

3,650,504

OPTICAL MOUNT

BACKGROUND OF THE INVENTION

1. Field of the Invention

The present invention relates to optical support systems. More particularly, the present invention is directed to a mount for the support of optical equipment wherein the optical equipment is easily mounted and demounted, and wherein the mount may have finished and/or reference surfaces for ease and repeatability of mounting, and wherein the mounted elements are significantly isolated from environmental vibrations.

2. Description of the Prior Art

The mounting and support of optical components, both for research and applied purposes, presents numerous problems, such as ease of mounting, repeatability and stability. The mounting and support of such optical components is particularly critical in laser and holographic research. Such research not only requires an extremely high degree of precision in the initial positioning of experimental optical equipment, but also requires that the experimental equipment maintain its original positioning throughout the experiment. Such stringent requirements as to the positioning of experimental optical equipment makes it imperative that the experimental equipment be mounted on support systems that are not only capable of precisely positioning the equipment, but also successfully isolate the equipment from environmental vibrations thereby maintaining the initial positioning of the experimental equipment throughout the experiment.

Ease of installation and removal of the equipment from mounts, and repeatability of positioning have also been persistent problems.

Numerous attempts have been made in the prior art to provide optical mounts capable of supporting optical equipment with high degrees of precision, repeatability and ease of mounting and removal. Such prior art mounts typically comprised various clamps or containers for mounting optical equipment on vibration isolation tables. These systems have proved to be unacceptable in that they failed to provide the desired ease of installation and removal or the desired repeatability and isolation from environmental vibration.

SUMMARY OF THE INVENTION

The present invention overcomes the disadvantages of the prior art and in so doing provides a mount which contains provisions for rapidly installing or removing one or more optical elements on the mount and also provides for precisely positioning the optical equipment and isolates the equipment from environmental vibration. The support system comprises a heavy mounting base element; means for positioning the base element on a supporting surface; one or more rectangular mounting plates; finished surfaces for slidably mounting one or more of the mounting plates on surfaces of the base element; and an eccentric lock for locking the mounting plates within the mounting base.

DESCRIPTION OF THE DRAWING

The present invention may be better understood and its numerous advantages will become apparent to those skilled in the art by reference to the accompanying drawing in which the single FIGURE is a perspective view of the preferred embodiment.

DESCRIPTION OF THE PREFERRED EMBODIMENT

Referring to the drawing, a preferred embodiment of the present invention is shown. A heavy base mounting element 10 is used to provide sufficient mass for stability and damping of environmental vibrations. The base element 10 is a heavy cast iron element, preferably weighing more than 10 pounds. Mount 10 comprises a flat rectangular web element 12, a trapezoidal bottom buttress 14, a trapezoidal side buttress 16 and a rectangular top buttress 18. The bottom buttress 14, side buttress 16, and top buttress 18 are formed around the perimeter of the rectangular element 12 in such a manner as to be perpendicular to the rectangular element 12. The rectangular element 12 bisects each buttress 14, 16, 18 along its major axis. The top buttress 18 connects with the narrower end of the side buttress 16, and the wide end of the side buttress 15 connects with the wide end of the bottom buttress 14. A mounting pin 20, having a circular cross section, is pressed into the lower surface 21 of the bottom buttress 14, and the pin 20 is sized so as to positively engage a corresponding positioning hole of the type currently used in state of the art experimental tables. Precision aligning surfaces 22 and 23 are machined in the lower portion of the side buttress 16 and the ends of lower surface 21, respectively. The precision aligning surfaces 22 and 23 facilitate use of a reference surface to position two or more base elements 10 parallel to and in line with each other and also provide references for the precision locations of elements to be mounted.

The base element 10 contains an opening 24 formed in the rectangular element 12. Upper positioning surfaces 26 and lower positioning surfaces 28 are machined on the front surface 30 and rear surface 32 of the rectangular element 12. The surfaces 30, 32, and hence positioning surfaces 26 and 28, are parallel to each other and perpendicular to the aligning surface 22. The lower positioning surfaces 28 are located adjacent to the lower periphery of the opening 24, and the upper positioning surfaces 26 are located adjacent to the upper periphery of the opening 24. Upper channels 34 are rigidly mounted on the upper positioning surfaces 26. Lower channels 36 are rigidly mounted on the lower positioning surfaces 28. The channels 34, 36 have L-shaped cross sections and may or may not be fabricated from aluminum extrusions. Each upper channel 34 contacts a corresponding upper positioning surface 26 with the tip of one leg of said channels 34 L-shaped cross section thereby forming, in combination with said upper positioning surface 26, an upper support member 38 having an inverted U-shaped cross-section. Each lower channel 36 contacts a corresponding lower positioning surface 28 with the tip of one leg of said channels 36 L-shaped cross section thereby forming, in combination with said lower positioning surface 28, a lower support member 40 having a U-shaped cross section. The support members 38, 40 are parallel to each other and perpendicular to the aligning surface 22. The interior surfaces of each L-shaped element 34 and 36 is machined or otherwise finished to provide smooth precision surfaces.

A positioning pin 42 is rigidly fixed in each lower channel 36 adjacent to the side buttress 16, the pins 42 serving to locate optical elements mounted in the channel. Each pin 42 protrudes vertically from the horizontal leg 44 of a lower channel 36 but does not extend beyond the lower periphery of the opening 24. A stud 46 is threaded in each upper positioning surface 26 diagonally to the positioning pins 42. A lever actuated eccentric 48 is rotatably mounted on each stud 46 for locking optical elements mounted in the channels.

A mounting plate 50 is slidably insertable in the upper channel 34 and lower channel 36 along the smooth precision surfaces thereof. The channels 34 and 36 provide vertical precision positioning for the plate 50. Horizontal precision positioning of the plate 50 is provided by locking eccentric 48 which, when rotated clockwise, engages an adjacent surface 52 of the plate 50 thereby forcing the plate 50 against the positioning pin 42. In like manner the plate 50 may be positioned between the upper channel 34 and lower channel 36 attached to the rear surface 32 of the rectangular element 12 by an eccentric 48 and positioning pin 42.

Mounting plate 50, for illustration only, is shown carrying an optical mirror 54. However the plate 50 may either carry or be formed as part of numerous additional types of optical equipment to be utilized with the support system, and any of such optical equipment can, with the present invention, be precisely positioned with respect to other equipment and also repeatedly remounted in a mount 10 with assurance of precise positioning on each remounting.

While a preferred embodiment has been shown various modifications and substitutions may be made without departing from the spirit and scope of the invention. Accordingly, it is to be understood that the present invention has been described by way of illustration and not limitation.

What is claimed is:

1. An optical mount comprising:
   a base member, said member having at least one precision support surface formed on one side thereof, said mount being supportable on said precision surface;
   a web member, said web member being affixed to the opposite side of said base member from said precision surface and extending from said base member in a direction perpendicular to the plane of said precision surface;
   first and second spacially displaced support elements attached to a first side of said web member, said support elements each having a precision mounting surface, said mounting surfaces being parallel to one another and to said base member precision surface and in part locating and supporting a mounting plate for an optical element; and
   means for locking a mounting plate in said support elements.

2. An optical mount as in claim 1 wherein said base member is provided with at least a second precision support surface.

3. An optical mount as in claim 2 wherein each of said support elements comprises:
   an L-shaped channel defining member which cooperates with a face of said web member to form a pair of opposed U-shaped openings for receiving a mounting plate.

4. An optical mount as in claim 3 wherein at least the portions of the face of said web member which in part define said U-shaped openings are precision machined surfaces.

5. An optical mount as in claim 1 further comprising:
   a positioning pin extending from the precision mounting surface of one of said support elements, said pin cooperating with said locking means to position and retain a mounting plate.

6. An optical mount as in claim 5 wherein said locking means comprises:
   an eccentrically mounted cam member for engaging and urging a mounting plate against said positioning pin.

7. An optical mount as in claim 1 further comprising:
   a side buttress member affixed to said base and web members and having an external precision positioning surface extending perpendicular to said base member positioning surface.

8. An optical mount as in claim 4 further comprising:
   a side buttress member affixed to said base and web members and having an external precision positioning surface extending perpendicular to said base member positioning surfaces.

9. An optical mount as in claim 6 further comprising:
   a side buttress member affixed to said base and web members and having an external precision positioning surface extending perpendicular to said base member positioning surface.

10. The optical mount of claim 1 further comprising:
    third and fourth spacially displaced support elements, said third and fourth support elements being affixed to said web member on the side opposite to that to which are affixed said first and second support elements, each of said third and fourth support elements having a precision mounting surface, said mounting surfaces extending from said web member and being parallel to one another and to said base member support surface.

11. The optical mount of claim 4 further comprising:
    third and fourth spacially displaced support elements, said third and fourth support elements being affixed to said web member on the side opposite to that to which are affixed said first and second support elements, each of said third and fourth support elements having a precision mounting surface, said mounting surfaces extending from said web member and being parallel to one another and to said base member support surfaces.

* * * * *